March 22, 1949.  F. E. PAYNE  2,464,989

SHAFT SEAL WITH "O" RING

Filed Dec. 21, 1946

INVENTOR.
Frank E. Payne
BY Charles F. Vytech
Atty.

Patented Mar. 22, 1949

2,464,989

UNITED STATES PATENT OFFICE 2,464,989

SHAFT SEAL WITH "O" RING

Frank E. Payne, Glencoe, Ill.

Application December 21, 1946, Serial No. 717,668

3 Claims. (Cl. 230—132)

This invention relates to mechanical seals such as are used between the shaft and housing of pumps or the like and particularly to such seals which use as a flexible sealing element a ring of resilient deformable material having a substantially circular radial cross-section.

The object of this invention is to provide a mechanical seal for a pump or the like wherein the seal does not extend radially outwardly an undue distance so as to obstruct the operation of the mechanism to which it is applied.

A more specific object of this invention is to provide a mechanical seal having a sealing washer of anti-friction material, a driving sleeve over which the washer is mounted, a sealing ring in the form of an endless resilient band of substantially circular radial cross-section in compression between the washer and sleeve and a spring surrounding the sleeve and centered thereby for holding the washer against the stationary sealing element.

Figure 1:
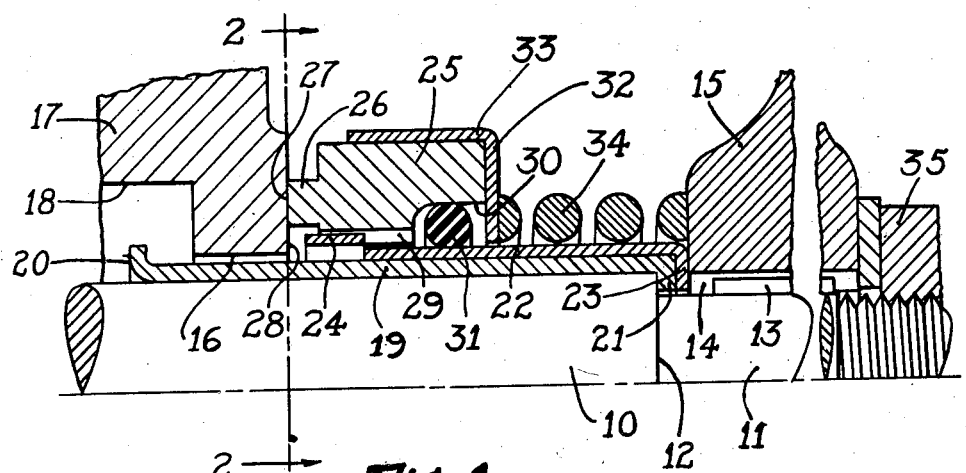
Figure 2:
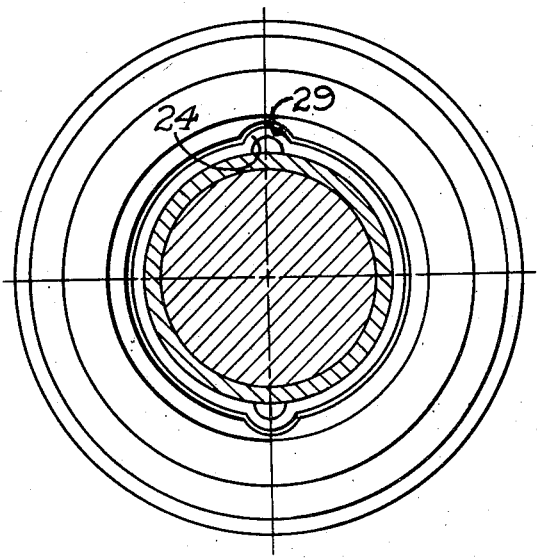

These and other objects of this invention will become apparent from the following detailed description when taken together with the accompanying drawings, in which Fig. 1 is a quarter section through a seal constructed in accordance with this invention; and Fig. 2 is an elevation taken along line 2—2 of Fig. 1.

Referring now to the drawings for a detailed description of the invention, there is shown a shaft 10 having a section 11 of reduced diameter with a shoulder 12 formed between the two sections of the shaft. The reduced section 11 is provided with a key 13 projecting into a keyway 14 in a pump impeller or the like, only the hub 15 of which is shown. Shaft 10 passes through an opening 16 in a housing 17, said housing having a recess 18 which may be used as an oil reservoir. A sleeve 19 is positioned over shaft 10, said sleeve having an outwardly turned flange 20 at the left-hand end thereof in recess 18 and a radially inwardly turned flange 21 at its opposite end. Flange 20 acts as an oil flinger and flange 21 is compressed against shoulder 12 by means hereinafter to be described so as to cause the sleeve to rotate with the shaft.

Mounted on sleeve 19 is a second sleeve 22 which is a part of the seal. Said sleeve 22 has a radially inwardly turned flange 23 abutting on flange 21 and is provided at its left-hand end with a pair of radially outwardly extending lugs 24 which, as shown in Fig. 2, are of substantially semicircular shape and are preferably integral with sleeve 22.

Surrounding a portion of sleeve 22 is a sealing washer 25 made of suitable anti-friction material such as a phenol-formaldehyde resin having dispersed therein asbestos and a powdered alloy of lead, tin and antimony. Other materials can be used depending upon the conditions under which the seal is to be used and the materials against which the washer is to run. Said washer 25 has an axially extending rib 26 with a radial face 27 engaging frictionally a radially disposed face 28 on housing 17. The faces 27 and 28 are preferably finished by grinding and lapping so as to be perfectly flat and smooth to prevent the passage of fluid therebetween. The interior surface of washer 25 is formed with notches 29 into which lugs 24 extend. It will be apparent that because of the lugs 24 and notches 29, washer 25 may move axially relative to sleeve 22 but it cannot rotate with respect thereto.

Washer 25 is also formed with a counterbore 30 so as to provide a space between the washer and sleeve. A ring 31 of resilient deformable material such as rubber, either natural or synthetic or a combination of the two, is compressed in counterbore 30 between the washer and sleeve 22 so as to form a fluid-tight seal between the washer and sleeve. The ring 31 in its free state is preferably formed with a circular radial cross-section so that it may roll evenly when washer 25 moves axially relative to sleeve 22. It will be noted that counterbore 30 is of greater axial dimension than the axial dimension of ring 31 so as to permit the ring to roll axially in the counterbore.

Ring 31 is retained in counterbore 30 by a flanged washer 32, the flange 33 of the washer being axially disposed and overlying the washer 25. A spring 34, which may be of the usual helical form, is compressed between washer 32 and the hub 15 of the impeller. A nut 35 is threaded over the end of the reduced section 11 of shaft 10 and serves to compress hub 15 and flanges 21 and 23 of sleeves 19 and 22 respectively against shoulder 12 on the shaft. This provides a fluid-tight joint between the impeller, flanges 23 and 21, and shaft 10. Said nut also takes the reaction of spring 34.

It will be observed that sleeve 22 and the lugs 24 coacting with notches 29 serve to relieve the sealing ring 31 of all driving torque and hence the pressure to which the ring is subjected in counterbore 30 is just sufficient to prevent a leak of the fluid past the ring but not necessarily great enough to provide a drive for the washer. This reduces the pressure required to move the washer relative to sleeve 22 and therefore reduces the size of the spring 34 required to hold the washer against housing 17. It will be noted that spring 34 is centered by sleeve 22 and is at about the smallest radius that it is possible to locate the spring thereby insuring a minimum of interference between the spring in the fluid pump. Washer 25 can of course be reduced in diameter beyond that shown, particularly if the material from which it is made has a high tensile strength. Where the material does not have a very high tensile strength flange 33 of washer 32 will act as a reinforcement for the washer to prevent its cracking by virtue of the radial pressure exerted on it by ring 31 when said ring is compressed in counterbore 30.

The use of a separate sleeve 22 on which to form the driving notches 24 rather than on some intermediate point on sleeve 19 results in a simpler and less expensive construction since to form the lugs directly in sleeve 19 would call for an expensive interior expanding die, whereas the formation of the notches on end of sleeve 19 permits the use of less expensive dies and of parts which are more readily accessible for maintenance purposes.

It is understood that the foregoing description is illustrative of preferred embodiments of this invention and that the scope of the invention is not to be limited thereto, but is to be determined by the appended claims.

What is claimed is:

1. A seal device for effecting a seal between a housing and a rotatable shaft passing therethrough, said device comprising a pair of sleeves of different lengths on the shaft, the shorter sleeve being telescoped over the longer sleeve, a radially outwardly disposed flange on the end of the longer sleeve, said housing having a portion disposed between the flanged end of the longer sleeve and the corresponding end of the shorter sleeve, an abutment on the shaft, means for compressing the sleeves against the abutment with a fluid-tight joint, a washer surrounding the shorter sleeve and having a substantially radially disposed sealing surface with a running fit against the housing, means for preventing relative rotation between the washer and shorter sleeve, means compressed between the washer and shorter sleeve for sealing the washer with respect to the shorter sleeve, and means for urging the washer against the housing.

2. A seal device for effecting a seal between a housing and a rotatable shaft passing therethrough, said device comprising a sleeve having a radially outwardly disposed flange at one end and a radially inwardly disposed flange at the other end, a shoulder on the shaft against which the radially inwardly disposed flange abuts, a sleeve telescoped over the first sleeve, said second-mentioned sleeve being shorter than the first sleeve and having a radially inwardly disposed flange abutting on the radially inwardly disposed flange on the first sleeve, a washer surrounding the second sleeve, said washer having a radially disposed sealing surface, a radially disposed sealing surface on the housing, means compressed between the washer and second sleeve for sealing the washer with respect to the second sleeve, means for preventing relative rotation between the second sleeve and washer, a removable abutment on the shaft, means for compressing said abutment and the two inwardly disposed flanges against the shoulder on the shaft to effect a fluid-tight seal between the second sleeve and shaft, and spring means compressed between the removable abutment and the washer for holding the sealing surfaces on the washer and housing in contact with one another.

3. A seal device for effecting a seal between the shaft of a vaned pump and a housing for the pump, said shaft passing through an opening in the housing, said device comprising a pair of sleeves telescoped one over the other and over the shaft, a shoulder on the shaft, inwardly turned flanges on the corresponding ends of the sleeves, the flange on the inner sleeve abutting on the shoulder, an impeller on the shaft, means for advancing the impeller toward the shoulder to compress the inwardly turned flanges against the shoulder with a fluid-tight fit and to prevent the outer sleeve from turning relative to the shaft, a sealing washer surrounding the outer sleeve, means for preventing relative rotation between the outer sleeve and washer, means compressed between the washer and outer sleeve for effecting a seal between the washer and outer sleeve, and a helical spring centered by the outer sleeve and compressed between the impeller and washer for holding the sealing washer against the housing to form a fluid-tight seal therewith.

FRANK E. PAYNE.

REFERENCES CITED

The following references are of record in the file of this patent:

UNITED STATES PATENTS

| Number | Name | Date |
| --- | --- | --- |
| 1,880,846 | Dake | Oct. 4, 1932 |
| 1,993,268 | Ferguson | Mar. 5, 1935 |
| 2,375,085 | Curtis | May 1, 1945 |
| 2,395,705 | Wool | Feb. 26, 1946 |